United States Patent [19]

Park et al.

[11] Patent Number: 5,538,928

[45] Date of Patent: Jul. 23, 1996

[54] DIELECTRIC CERAMIC COMPOSITION FOR HIGH FREQUENCIES AND METHOD FOR PREPARATION OF THE SAME

[75] Inventors: Yung Park; Yoon H. Kim, both of Seoul, Rep. of Korea

[73] Assignee: Korea Institute of Science and Technology, Seoul, Rep. of Korea

[21] Appl. No.: 504,099

[22] Filed: Jul. 19, 1995

[30] Foreign Application Priority Data

Jul. 19, 1994 [KR] Rep. of Korea ................ 17413/1994

[51] Int. Cl.$^6$ ................................................ C04B 35/462
[52] U.S. Cl. ................................ 501/134; 264/66
[58] Field of Search ............................... 501/134; 264/66

[56] References Cited

U.S. PATENT DOCUMENTS

| | | | |
|---|---|---|---|
| 4,339,543 | 7/1982 | Mage et al. | 501/134 |
| 4,665,041 | 5/1987 | Higuchi et al. | 501/134 |
| 5,132,258 | 7/1992 | Takahashi et al. | 501/134 |
| 5,432,134 | 7/1995 | Park et al. | 501/134 |

FOREIGN PATENT DOCUMENTS

| | | | |
|---|---|---|---|
| 52-17697 | 2/1977 | Japan | 501/134 |
| 52-17700 | 2/1977 | Japan | 501/134 |
| 58-018808 | 2/1983 | Japan | 501/134 |
| 60-176968 | 9/1985 | Japan | 501/134 |
| 4-106807 | 4/1992 | Japan | 501/136 |

*Primary Examiner*—Anthony Green
*Attorney, Agent, or Firm*—Lowe, Price, LeBlanc & Becker

[57] ABSTRACT

An improvd dielectric ceramic composition for high frequencies and a method for preparation of the same, capable of being advantageously used for a substrate of dielectric resonator, glabal positioning system and the like in high frequency regions, which consists of a main component of $Zr_{1-x}Sn_xTi_{1+y}O_4$ and sintering aid component of $MnO_2$, NiO and $Sb_2O_3$, wherein the molar ratio X and Y are respectively, $0.1 \leq X \leq 0.3$ and $-0.1 \leq Y \leq 0.1$ and the sintering aid component essentially consists of, based on the total amount of the main component, 3% or less of $MnO_2$ and 2 wt % or less of NiO and $Sb_2O_3$ in a combined amount.

2 Claims, No Drawings

DIELECTRIC CERAMIC COMPOSITION FOR HIGH FREQUENCIES AND METHOD FOR PREPARATION OF THE SAME

BACKGROUND OF THE INVENTION

1. Field of the Invention

The present invention relates, in general, to a dielectric ceramic composition for high frequencies and, more particularly, to a dielectric ceramic composition of a $ZrO_2$-$TiO_2$-$SnO_2$ system which exhibits superior electrical quality factor Q, dielectric constant k and temperature coefficient of resonant frequency $\tau_f$ in high frequency regions. The present invention also relates to a method for preparing such dielectric ceramic composition.

2. Description of Prior Art

Conventionally, various kinds of dielectric ceramics are widely used for the materials of a dielectric resonator, a global positioning system, and the like. Recent trends to use higher frequencies in microwave systems have demanded for dielectric ceramic compositions with better electrical properties, such as improved quality factor Q, dielectric constant k and stable temperature coefficient of resonant frequency $\tau_f$.

Among conventional dielectric magnetic compositions for high frequencies, one suggested in U.S. Pat. No. 4,665,041 has been known to be superior in quality factor Q and dielectric constant k. The dielectric ceramic compositions of supra patent is composed of a main component of a $TiO_2$-$ZrO_2$-$SnO_2$ system and additives comprising ZnO, NiO, and one selected from $Nb_2O_5$, $Ta_2O_5$, $WO_3$ and $Sb_2O_5$. However, this composition has disadvantages in that its dielectric constant is only about 35, even though its Q value is considerably improved. Another problem involved in this patent lies in that the production cost is high and it is difficult to control the precise production process therefor, since the dielectric composition of this patent consists of too many materials.

SUMMARY OF THE INVENTION

Accordingly, it is an object of the present invention to provide a dielectric ceramic composition for high frequencies and a method for preparation of the same, which overcomes the problems encountered in conventional dielectric ceramic compositions for high frequencies and a method for preparation of the same.

It is another object of the present invention to provide an improved dielectric ceramic composition for high frequencies capable of being advantageously used for materials of a dielectric resonator, substrate for an integrated circuit or the like, having a $ZrO_2$-$TiO_2$-$SnO_2$ system as a main component.

To achieve the above-described objects, there is provided a dielectric ceramic composition for high frequencies, which consists of a main component of $Zr_{1-x}Sn_xTi_{1+y}O_4$ (wherein $0.1 \leq X \leq 0.3$, $-0.1 \leq Y \leq 0.1$ in molar ratio) and a sintering aid component comprising, based on the total amount of the main component, 3 wt. % or less of $MnO_2$, 2 wt. % or less of NiO and $Sb_2O_3$ as a combined amount.

DETAILED DESCRIPTION OF THE INVENTION

A dielectric ceramic composition for high frequencies according to the present invention comprises a main component of $Zr_{1-x}Sn_xTi_{1+y}O_4$ (wherein $0.1 \leq X \leq 0.3$, $-0.1 \leq Y \leq 0.1$ in molar ratio) and a sintering aid component comprising $MnO_2$, NiO and $Sb_2O_3$. The sintering aid component consists of, with respect to the total amount of the main component, 3 wt. % or less of $MnO_2$, 2 wt. % or less of NiO and $Sb_2O_3$ as a combined amount.

The reason for the compositional limitation of each compound according to the present invention is explained as follows.

To begin with, if the molar ratio X is less than 0.1, dielectric constant k and the quality coefficient Q significantly decrease due to the insufficient sintering. On the contrary, if X is more than 0.3, the quality coefficient Q and temperature coefficient of resonant frequency $\tau_f$ decrease, while dielectric constant k increases.

On the other hand, the sintered state of a pure zirconium titanate is not satisfactory.

Additionally, if Y exceeds 0.1, the quality coefficient Q and temperature coefficient of resonant frequency $\tau_f$ decrease and if Y is less than –0.1, the sintering state becomes poor.

Meanwhile, the reason for the limitation of the content of the sintering aid component is explained as follows.

When the content of $MnO_2$ exceeds 3 wt. % with respect to the total amount of the main component, the quality coefficient Q decreases and if the combined amount of NiO and $Sb_2O_3$ exceeds 2 wt. % with respect to the total amount of the main component, the sintering state becomes poor.

The preparation process of the dielectric ceramic composition for high frequencies according to the present invention is as follows.

The powders of the main component and sintering aid component is weighed within the aforementioned ranges and mixed together, calcined at a temperature range of 1000° to 1200° C. and then ground. Thereafter, a molding process followed and the molded compound is sintered at a temperature range of 1300° to 1500° C. under an oxygen atmosphere.

The dielectric ceramic composition prepared thereby has a relatively high dielectric constant of at least 35 at 9 GHz, 25° C., quality coefficient of at least 4000, and Q×f value of at least 40000. For example, a composition according to the present invention such as $Zr_{0.8}Sn_{0.2}TiO_4$–0.8 wt. % of $MnO_2$–0.5 wt. % of NiO–1.1 wt. % of $Sb_2O_3$ sintered at 1350° C. for 2 hours exhibits the dielectric constant(k) of 41.2 at 9 GHZ, the quality coefficient(Q) of 6800, and the multiplied value of the quality coefficient (Q) and frequency (f) of 61000.

Therefore, the dielectric ceramic composition according to the present invention can be used as materials of a dielectric resonator and a global positioning system.

EXAMPLE

The powders of the main composition having over 99% purity and sintering aid components were weighed according to the Table I, and then mixed for about 2 hours using a nylon jar, a $ZrO_2$ ball, and a planetary mill.

At this time, distilled water is used as a dispersant. The resultant slurry was dried and heat-treated at a temperature of 1000°–1200° C. and then pulverized to a suitable size.

The pulverized powder mixture was molded under a pressure of 1 ton/cm² using a dried-type press for fabricating specimens having a diameter of 10.0 mm, and a thickness of 4.0 mm, 4.5 mm, and 5.0 mm, respectively. Thereafter, the specimens were sintered at a temperature of 1300° to 1500°

C. under an oxygen atmosphere. Both sides of the specimens were ground to have flat surfaces. Then, according to the Hakki Coleman method, quality factor(Q), dielectric constant(k), and temperature coefficient of resonant frequency($\tau_f$) were determined. Results are shown in Table I.

TABLE 1

Compositions and Properties of Dielectric Ceramic Compositions

| Specimen No. | | 1 | 2 | 3 | 4* | 5* | 6* | 7* | 8 | 9* | 10 | 11* |
|---|---|---|---|---|---|---|---|---|---|---|---|---|
| Main comp. (mol) | $ZrO_2$ (1−X) | 0.80 | 0.73 | 0.78 | 0.73 | 0.80 | 0.50 | 0.78 | 0.70 | 0.75 | 0.74 | 0.74 |
| | $SnO_2$ (X) | 0.20 | 0.27 | 0.22 | 0.27 | 0.20 | 0.50 | 0.22 | 0.30 | 0.25 | 0.26 | 0.26 |
| | $TiO_2$ (1+Y) | 1 | 1.05 | 1.02 | 1 | 1 | 1 | 1 | 0.98 | 1.15 | 1 | 1 |
| Sinter. Aid | $MnO_2$ (Z) | 0.8 | 0.5 | 0.4 | 0 | 0 | 0.7 | 5.0 | 0.4 | 0.7 | 0.4 | 0.4 |
| Comp. (wt %) | NiO (a) | 0.5 | 0.2 | 0.3 | 0.2 | 0 | 0.3 | 0.2 | 0.3 | 0.2 | 0.4 | 3.0 |
| | $Sb_2O_3$ (b) | 1.1 | 1.0 | 0.9 | 1.0 | 0 | 1.0 | 0.8 | 1.1 | 1.2 | 1.3 | 2.0 |
| Sintering Temp (°C.) | | 1350 | 1370 | 1340 | 1350 | 1500 | 1300 | 1350 | 1370 | 1360 | 1320 | 1320 |
| Contraction Rate (%) | | 16.0 | 15.8 | 16.5 | 17.5 | 12.0 | 17.0 | 18.0 | 17.0 | 17.0 | 16.5 | 18.0 |
| k (at 9 GHz) | | 41.2 | 37.5 | 37.8 | 37 | 28 | 45 | 30 | 39 | 35 | 37.2 | 40 |
| Q (at 9 GHz) | | 6800 | 5800 | 5700 | 4600 | 2000 | 1000 | 3200 | 5400 | 2500 | 5900 | 1000 |
| τ (ppm/°C.) | | −10 | −5 | 0 | −10 | 50 | 300 | 10 | 20 | 50 | 10 | 400 |
| Q × f (÷100) | | 610 | 552 | 513 | 414 | 180 | 90 | 288 | 486 | 225 | 531 | 90 |

*Comparative specimens

The main component is represented by $Zr_{1-X}Sn_XTi_{1+Y}O_4$. The sintering aid component, $MnO_2$, NiO and $Sb_2O_3$ are added hereto.

Contraction rate is calculated as per the following equation:

$$\text{Contraction rate (\%)} = \frac{D_0 - D}{D_0} \times 100$$

wherein

D: diameter of the disk after sintering $D_0$: diameter of the disk before sintering

What is claimed is:

1. A dielectric ceramic composition for high frequencies, comprising a main component of $Zr_{1-X}Sn_XTi_{1+Y}O_4$ and a sintering aid component of $MnO_2$, NiO, and $Sb_2O_3$, wherein X and Y represent molar ratios and are respectively, $0.1 \leq X \leq 0.3$ and $-0.1 \leq Y \leq 0.1$ and wherein $MnO_2$ is present in an amount of greater than 0 and up to 3 wt % and NiO and $Sb_2O_3$ are present in an amount of greater than 0 and up to 2 wt %, based on the total amount of the main component.

2. A method for preparing the dielectric ceramic composition of claim 1 which comprises mixing the main component and sintering aid component to form a mixture calcining the obtained mixture at 1000° to 1200° C. and then sintering at 1300° to 1600 ° C. under an oxygen atmosphere.

* * * * *